United States Patent
Cellini et al.

[19]

[11] Patent Number: 6,052,976
[45] Date of Patent: Apr. 25, 2000

[54] TRIMMER SHIELD FOR GRASS TRIMMER

[75] Inventors: Richard L. Cellini, Burnsville; Jeffrey E. Zander, Minnetonka, both of Minn.

[73] Assignee: The Toro Company, Bloomington, Minn.

[21] Appl. No.: 09/099,576

[22] Filed: Jun. 19, 1998

[51] Int. Cl.[7] .................................................. A01D 34/03
[52] U.S. Cl. .............. 56/17.4; 56/DIG. 20; 56/DIG. 24; 56/12.7; 172/13; 30/276
[58] Field of Search .................................. 56/12.1, 17.4, 56/12.7, DIG. 20, DIG. 24; 30/276; 172/13, 11

[56] References Cited

U.S. PATENT DOCUMENTS

| | | |
|---|---|---|
| D. 373,712 | 9/1996 | Bridgers . |
| D. 382,779 | 8/1997 | Meisner et al. . |
| D. 382,780 | 8/1997 | Meisner et al. . |
| 4,049,059 | 9/1977 | Weibling . |
| 4,200,978 | 5/1980 | Irelan et al. ................................ 30/276 |
| 4,237,610 | 12/1980 | Bradus et al. ............................. 30/276 |
| 4,651,422 | 3/1987 | Everts . |
| 4,712,363 | 12/1987 | Claborn ..................................... 172/13 |
| 4,890,389 | 1/1990 | Whitkop . |
| 5,010,720 | 4/1991 | Corsi . |
| 5,060,383 | 10/1991 | Ratkiewich ............................... 30/276 |
| 5,351,403 | 10/1994 | Becker et al. ............................. 30/276 |
| 5,493,784 | 2/1996 | Aiyama ..................................... 30/276 |
| 5,584,348 | 12/1996 | Butler ....................................... 30/376 |
| 5,615,970 | 4/1997 | Reekie et al. ........................... 403/379 |
| 5,644,844 | 7/1997 | Pink ......................................... 56/12.7 |

OTHER PUBLICATIONS

Three Photographs of a Trimmer Shield from a Toro® Electric Trimmer, The Toro Company, 1994. (Exhibits A1–A3).

Three Photographs of a Trimmer Shield from a Black & Decker® Electric Trimmer (Model cST–1000). (Exhibits B1–B3).

*Primary Examiner*—Thomas B. Will
*Assistant Examiner*—Arpad Fabian Kovacs
*Attorney, Agent, or Firm*—Mueting, Raasch & Gebhardt, P.A.

[57] ABSTRACT

A grass trimmer with a trimmer shield that can be manually assembled to the housing without the use of tools is disclosed. The trimmer shield can also preferably be disassembled from the housing by a consumer to allow for replacement of the trimmer shield. One preferred trimmer shield includes at least one retaining member that prevents translational movement of the trimmer shield and at least one retaining member that prevents deflection of the trimmer shield in a vertical direction.

15 Claims, 6 Drawing Sheets

TRIMMER SHIELD FOR GRASS TRIMMER

FIELD OF THE INVENTION

The present invention relates to the field of grass and weed trimmers, referred to commonly as grass trimmers. More particularly, the present invention relates to a trimmer shield that attaches to the housing of a grass trimmer without the use of tools.

BACKGROUND OF THE INVENTION

Grass trimmers using a rotating segment of flexible line or blade assembly to trim weeds, grass and other vegetation are well-known. Typically, grass trimmers include a handle, a motor, an elongated shaft and a lower housing unit from which the trimming element extends and rotates to cut grass, weeds, and other vegetation. The motor may be mounted in the lower housing of the grass trimmer or it may be mounted at the opposite end of the elongated tube (near the operator) depending on the style of the trimmer. Furthermore, the grass trimmers may be powered by combustible fuel engines, as well as electric motors. The versions driven by electric motors may be connected to a line source such as 120 volt alternating current electric power, or they may be powered by a battery pack or other source of direct current electrical power.

Many grass trimmers include a trimmer shield designed to deflect debris travelling rearwardly away from the housing towards the ground or to the sides of the trimmer housing. When used in connection with flexible line trimmers, the shields may also include a cutting element such as a blade to automatically trim the cutting line to the proper length for rotation within the trimmer shield.

The trimmer shields are commonly attached to the housings either permanently, i.e., at manufacturing, or are designed for attachment to the housing by a purchaser of the unit using screws or other mechanical fasteners provided with the grass trimmer. Disadvantages of purchaser-assembled trimmer shields include the need to ensure that the proper fasteners are located within the package with the grass trimmer, the requirement that the purchaser have access to the appropriate tool or tools required for the fasteners, the need for the purchaser to be adept at operating or handling the tools required to attach the trimmer shield to the housing.

SUMMARY OF THE INVENTION

The present invention provides grass trimmer with a trimmer shield that can be assembled to the housing without the use of tools and, in addition, can be disassembled from the housing by a consumer to allow for replacement of the trimmer shield.

It is desirable to provide the trimmer shield detached from the housing of the grass trimmer for a number of reasons. One such advantage is that the trimmer can be sold in a disassembled condition allowing for its packaging in a smaller box or other container. The size of boxes or containers are particularly important to retailers, as a smaller box occupies less shelf space, thereby allowing for the display of more items in the same amount of space or the same amount of items in a smaller amount of space. In either event, overhead can be reduced by reducing shelf space required to display products to customers.

It is also further advantageous to provide a grass trimmer shield that is easily assembled by a purchaser without the use of tools such as screwdrivers, pliers, wrenches, etc. Many consumers prefer not to employ tools for a variety of reasons and the ability to offer a product that can be assembled without the use of tools would be advantageous.

It would also be advantageous to provide a trimmer shield that can be removed by the consumer without substantial disassembly of the housing unit to replace the trimmer shield if it becomes damaged during use or storage of the grass trimmer.

In one aspect, the present invention provides a hand-held grass trimmer including a housing having a front and a rear; a trimming element rotating below the housing about a first axis of rotation, wherein the first axis is generally vertical; a trimmer shield attached to the housing; at least one first retaining members integral with the trimmer shield, each of the first retaining members extending through a retaining opening located in the housing, wherein the first retaining members and retaining openings cooperate to restrict first movement of the trimmer shield away from the housing in a horizontal direction; and at least one second retaining member integral with the trimmer shield, wherein the second retaining member cooperates with the housing to restrict deflection of the trimmer shield about a generally horizontal axis intersecting at least one of the retaining openings.

In another aspect, the present invention provides a method of assembling a hand-held grass trimmer including providing a housing having a front and a rear, the housing having at least one retaining opening in the housing and a trimming element attached to the housing, the trimming element rotating about a first axis of rotation, wherein the first axis is generally vertical; providing a trimmer shield including at least one integral first retaining member and at least one second retaining member; manually moving the housing and trimmer shield translationally relative to each other in a generally horizontal direction to align each of the first retaining members with one of the retaining openings in the housing, and further wherein the second retaining member engages the housing, wherein the trimmer shield is restricted from rotation about a generally horizontal axis intersecting at least one of the retaining openings; and manually engaging each of the first retaining members with one of the retaining openings, whereby the trimmer shield is manually attached to the housing.

In another aspect, the present invention provides a method of disassembling a hand-held grass trimmer including providing a grass trimmer having a housing having a front and a rear; a trimming element rotating below the housing about a first axis of rotation; a trimmer shield attached to the housing; at least two first retaining members integral with the trimmer shield, each of the first retaining members extending through a retaining opening located in the housing, wherein the first retaining members and retaining openings cooperate to restrict translational movement of the trimmer shield in a direction generally perpendicular to the first axis of rotation; and at least one second retaining element integral with the trimmer shield, wherein the second retaining element engages with the housing to restrict rotation of the trimmer shield about a second axis extending through at least one of the first retaining members. Also included in the method are removing each of the first retaining members from the retaining openings in the housing and manually moving the trimmer shield translationally in a direction away from the housing, wherein the second retaining element member disengages from the housing, and further wherein the trimmer shield is removed from attachment to the housing.

These and other features and advantages of the present invention are described below with respect to one illustrative embodiment of a grass trimmer and trimmer shield according to the present invention.

DETAILED DESCRIPTION OF THE INVENTION

The trimmer shields in the grass trimmers according to the present invention are preferably attached to the housing of the grass trimmer manually. As used in connection with the present invention, the term "manually" will be used to indicate that the operation described can be completed without the use of tools, such as screwdrivers, wrenches, pliers, etc. It is further preferred that the trimmer shields be detachable from the housings of the grass trimmers for replacement or any other purpose.

Although it is preferred that the trimmer shields be manually assembled to the housings, manual disassembly is not required. In many instances, it may be that although manual assembly is provided for, disassembly will require at least minimal use of one or more tools. It is, however, preferred that the housings need not be disassembled to remove the trimmer shields.

The housings of grass trimmers may be generally elongated from the front to the rear. In other words, the length of the housing from the front to the rear may be greater than the width of the housing measured generally transverse to the length of the housings.

Figure 1:
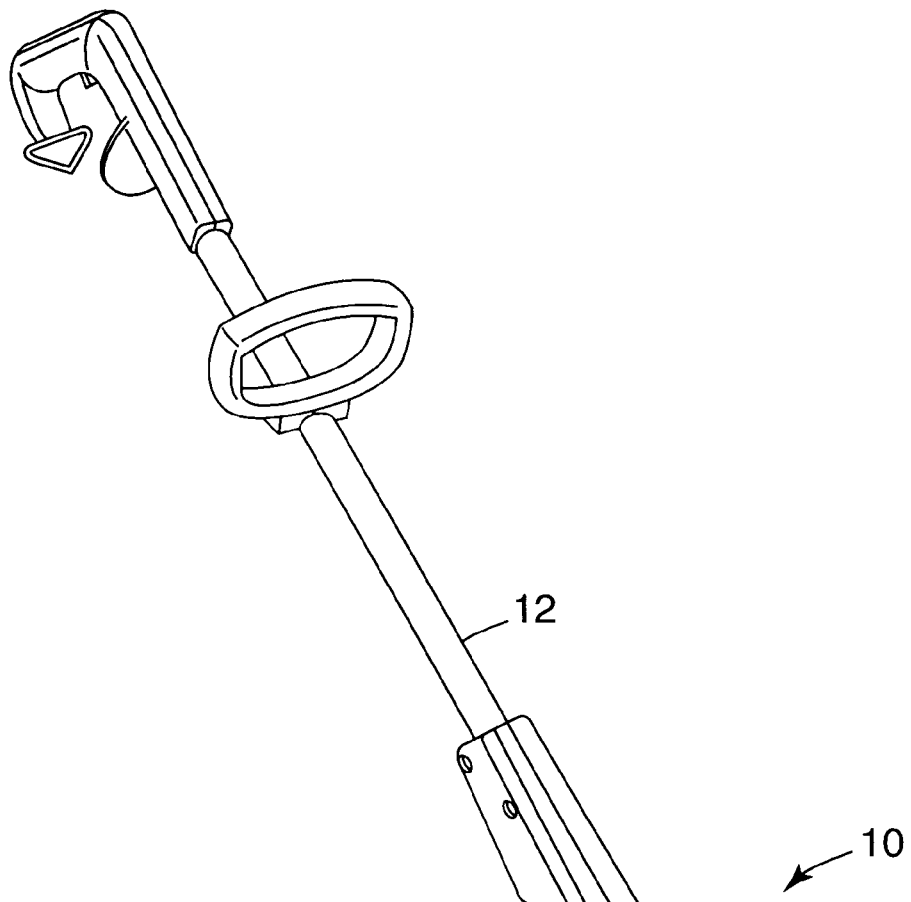
FIG. 1 is a perspective view of a hand-held grass trimmer including a trimmer shield according to the present invention.

FIG. 1 is a perspective view of one hand-held grass trimmer 10 including a trimmer shield 30 attached to the lower housing 20 according to the present invention. The illustrated grass trimmer 10 includes a trimming element 18 that rotates below the housing 20 and within the trimmer shield 30 as described below to cut or trim grass and other vegetation. The illustrated trimming element 18 is a line-type trimming element, although it will be understood that the present invention could also be used with blade-type trimming elements.

Figure 2:
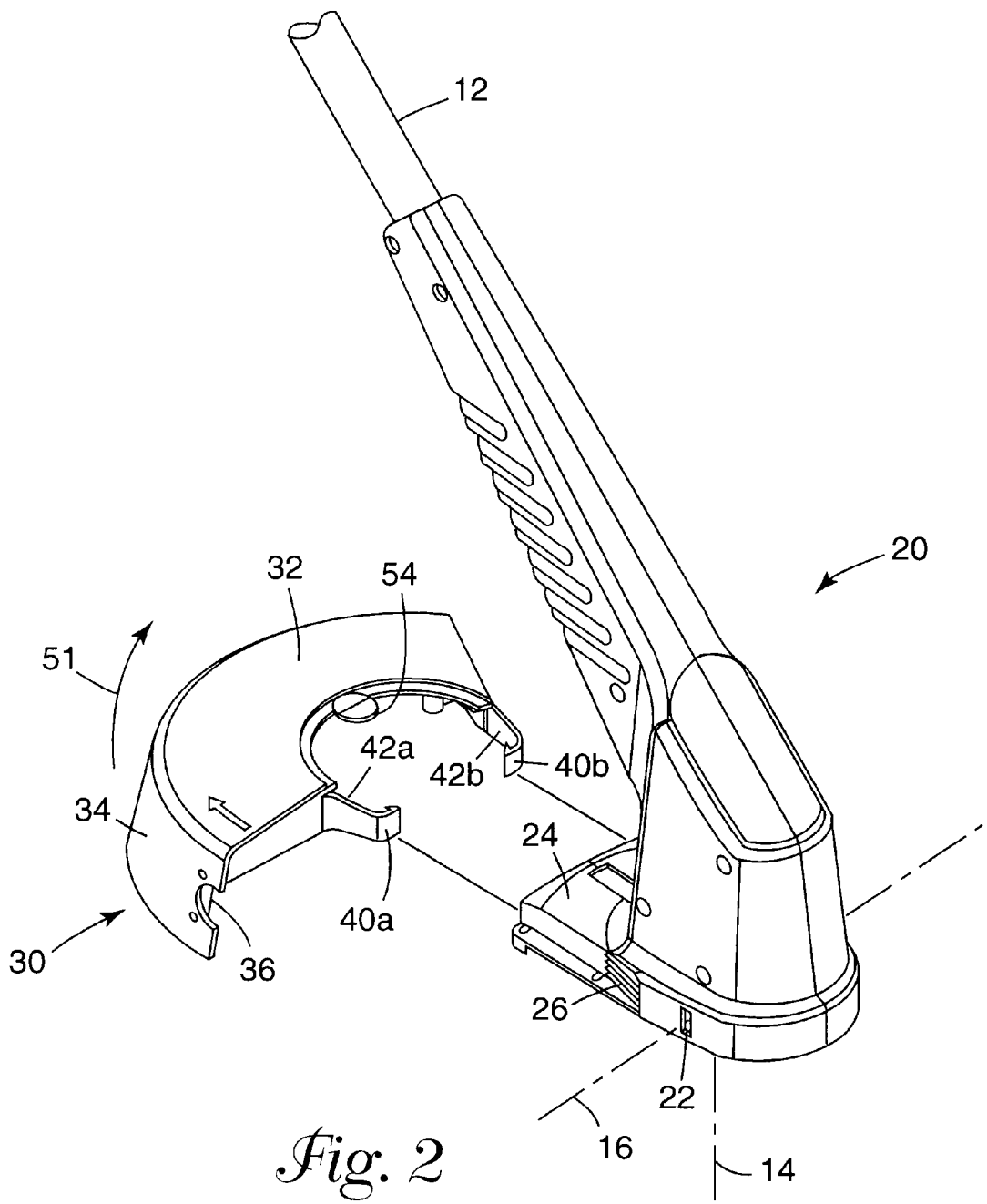
FIG. 2 is a partial view of an exploded grass trimmer illustrating attachment of the trimmer shield to the housing.

FIGS. 2–6 illustrate various views of the lower portion of illustrative grass trimmer 10 in which the trimming element 18 has been removed for clarity. FIG. 2 is a perspective view of the lower portion of the grass trimmer 10 including the housing 20 mounted on an elongated handle 12 and the trimmer shield 30 shown separated from the housing 20. The illustrated housing 20 also preferably includes a housing deck 24 along with at least two retaining openings 22, only one of which is shown in FIG. 2. It will be understood that the other retaining opening 22 is located on the opposite side of the housing 20. The illustrated housing 20 also includes ramps 26 located on both sides of the housing 20. The ramps 26 and retaining openings 22 will be discussed in more detail below with respect to assembly of the trimmer shield 30 to the housing 20 of the grass trimmer 10.

Also depicted in FIG. 2 is an axis of rotation 14 about which the trimming element (reference no. 18 in FIG. 1) rotates when the grass trimmer 10 is in use. For reference purposes, it will be assumed that the axis of rotation defines the vertical direction with respect to the grass trimmer 10. As discussed above, the grass trimmers of the present invention can be used with either line-type trimming elements or blades depending on a variety of factors such as the type of vegetation to be trimmed by the trimming unit. Regardless of the type of trimming element used, however, it will rotate about the axis of rotation 14 during operation and that rotation will typically be in a plane that is generally perpendicular to the axis of rotation 14. In other words, the trimming element will rotate about the vertical axis 14 in a generally horizontal plane. It will, however, be understood that during operation of the trimmer 10, the housing 20 may be rotated to edge, e.g., a sidewalk, and that in that orientation the axis 14 will be generally horizontal (with respect to the ground). That is not, however, the normal orientation of the trimmer 10 when used to trim around trees, along fences, etc.

Also depicted in FIG. 2 is an illustrative trimmer shield 30 which includes upper surface 32 and a rim 34 extending in a downward direction from the upper surface 32. Also forming a part of the illustrated trimmer shield 30 is a cutting blade 36. The illustrated grass trimmer 10 is preferably used with a line-type cutting element that can be fed out of a larger supply, but then must be trimmed off to rotate freely within the trimmer shield 30. The cutting element 36 performs the task of trimming the line element to its proper length for free rotation within the trimmer shield 30.

It is preferred that the trimmer shield 30 attach to the housing 20 with translational motion, as opposed to rotational motion. The translational movement of the trimmer shield 30 in a generally horizontal direction (as compared to the generally vertical axis 14) towards the housing 20 is better adapted for use with elongated housings than rotational motion. To assist in retaining the trimmer shield 30 on the housing 20 are a pair of first retaining members 40a and 40b (collectively referred to as first retaining members 40) that are attached to the illustrated trimmer shield 30 by a pair of first retaining member legs 42a and 42b (referred to collectively as first retaining member legs 42). It will be understood that the first retaining member legs 42 are optional, although they do assist in moving the first retaining members 40 farther forward on the housing 20 which can make the connection to the housing 20 easier and more secure. The first retaining members 40 prevent or restrict the trimmer shield 30 from moving in a generally horizontal direction away from the housing 20.

It is preferred that the outside perimeter of the trimmer shield 30 have a generally arcuate or curved shape such that a portion of the circular path of the trimming element moves within or below the trimmer shield 30 during a portion of its rotation about axis of rotation 14. It is neither preferred or desirable that the trimmer shield 30 extend completely around the path of the trimming element because at least a portion of that path should be open to allow the trimming element to sever grass, weeds or other vegetation as it rotates about axis 14.

The illustrated housing 20 depicted in FIG. 2 preferably includes an optional housing deck 24 extending generally rearwardly from the housing 20. The housing deck 24 provides additional support for the trimmer shield 30 during use of the grass trimmer 10.

Figure 3:
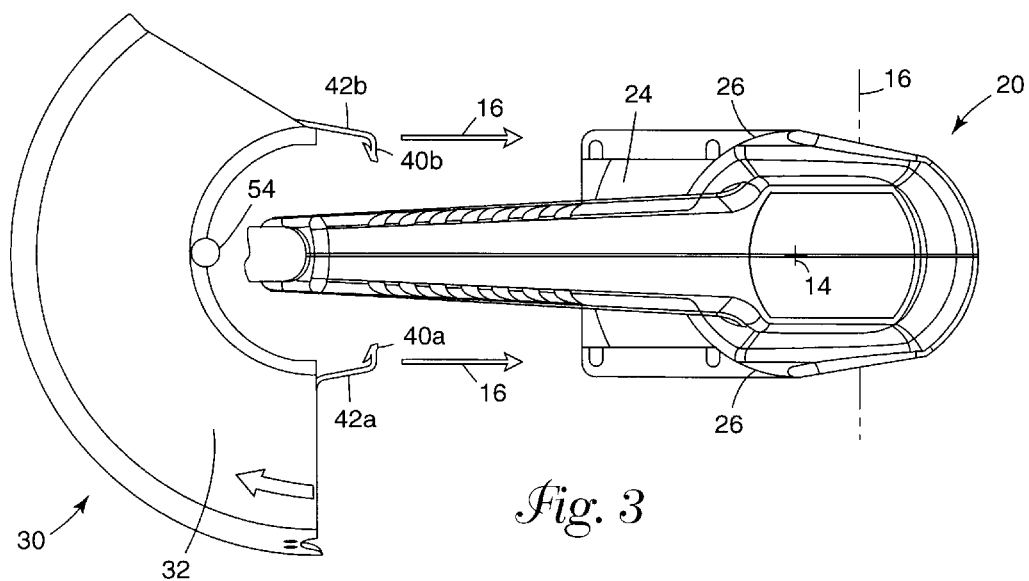
FIG. 3 is a top plan view of the grass trimmer of FIG. 2.

Referring now to FIG. 3, it can be seen that, during assembly, the trimmer shield 30 is preferably moved in a straight line translational direction generally towards the front of the housing 20 as depicted by arrows 16 in FIG. 3. That direction moves the trimmer shield 30 over the housing deck 24 and it also preferably moves the first retaining members 40 into alignment with the retaining openings 22 (see FIG. 2) of the housing 20.

As can also be seen in FIG. 3, the ramps 26 on the housing 20 assist in moving the first retaining members 40 outwardly as the trimmer shield 30 is moved towards the front of the trimmer housing 20. The distance between the first retaining members 40 before assembly of the trimmer shield 30 onto the housing 20 is preferably smaller than the distance between the retaining openings 22 on the housing 20, As a result, when the first retaining members 40 are aligned with the retaining openings 22 on the housing 20, the first retaining members 40 are biased inwardly towards each other by the inherent resilience of the materials used to construct the trimmer shield 30. Retaining member legs 42 are preferably long enough to allow for proper motion of the first retaining members 40 as described above without permanent or significant permanent deformation of the retaining legs 42.

It is also preferred that the first retaining members 40 and any associated structures required to attach them to the remainder of the trimmer shield 30, such as retaining member legs 42, be completely integral with the remainder of the trimmer shield 30. The trimmer shields 30 are typically molded of one or more polymers or other suitable materials and it is preferred that the first retaining members 40 and their associated structures also be molded integral with the remainder of the trimmer shield 30 for a number of reasons including, but not limited to: ease of manufacture, cost, simplicity, aesthetic appearance, etc.

Figure 4:
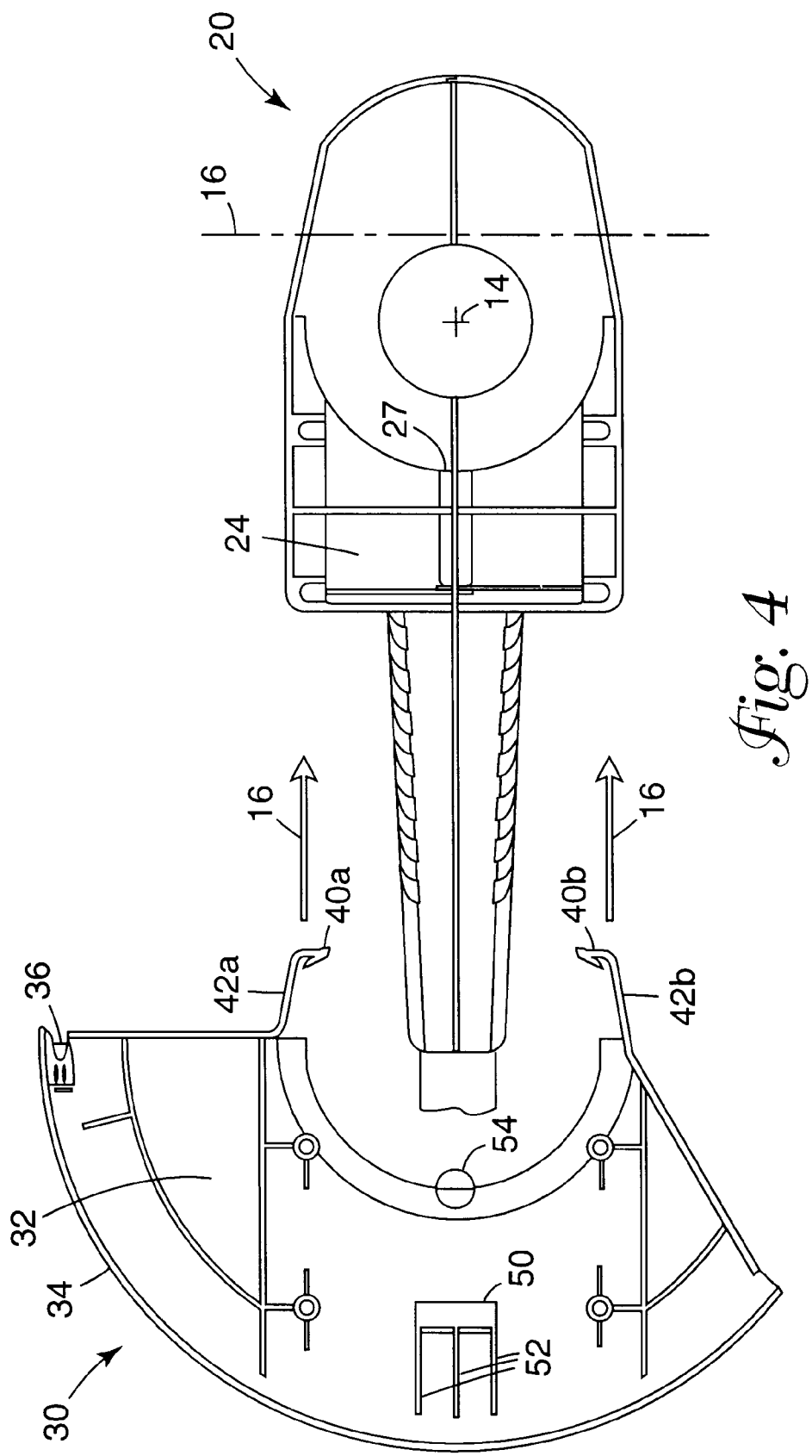
FIG. 4 is a bottom plan view of the grass trimmer of FIG. 2.

FIG. 4 is a bottom view of FIG. 3 depicting some additional features of the illustrated trimmer shield 30 according to the present invention. FIG. 4 also depicts the translational motion along direction 16 that is used to attach the trimmer shield 30 to the housing 20 of the grass trimmer. The additional structure depicted in FIG. 4 includes a second retaining member 50 and its associated support ribs 52. The second retaining member 50 is used to secure the trimmer shield 30 to the rear deck housing 24 of the housing 20 as will be described in more detail below.

The third point of attachment between the trimmer shield 30 and the housing 20 provided by the second retaining member 50 assists in preventing or restricting deflection of the trimmer element 30 upward in the direction of arrow 51 (see FIG. 2). Alternatively, the second retaining member 50 can be described as preventing or restricting rotation of the trimmer shield 30 about a generally horizontal axis 16 that intersects at least one of the first retaining members 40. The housing deck 24 alone prevents downward rotation of the trimmer shield 30 while second retaining member 50 prevents or restricts upward deflection of the trimmer shield 30. It will be understood that the housing deck 24 is optional and that, in some grass trimmers 10 one or more second retaining members 50 may be provided that restrict both upward and downward deflection of the trimmer shield 30.

Figure 5:
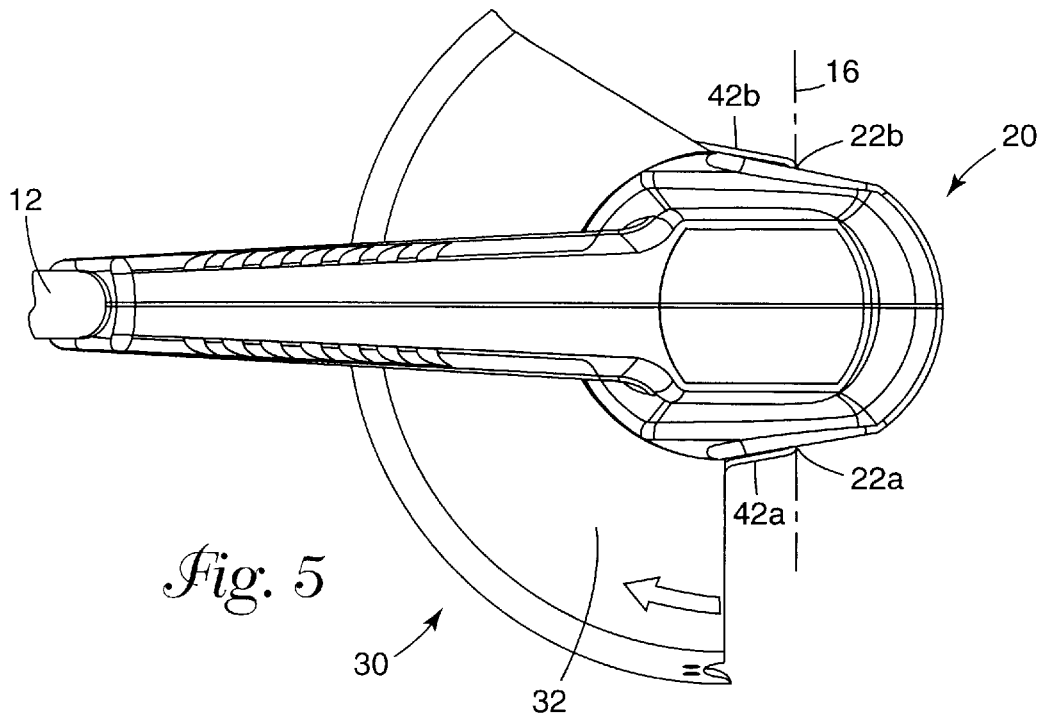
FIG. 5 is a top plan view of the grass trimmer of FIG. 2 with the trimmer shield assembled to the grass trimmer housing.

FIG. 5 is a top view of the trimmer shield 30 attached to the housing 20 with the first retaining members 40 on the ends of the first retaining member legs 42 not shown because they are extending through the retaining openings 22a and 22b in the housing 20. The retaining member legs 42 are, however, visible in the view of FIG. 5.

Figure 6:
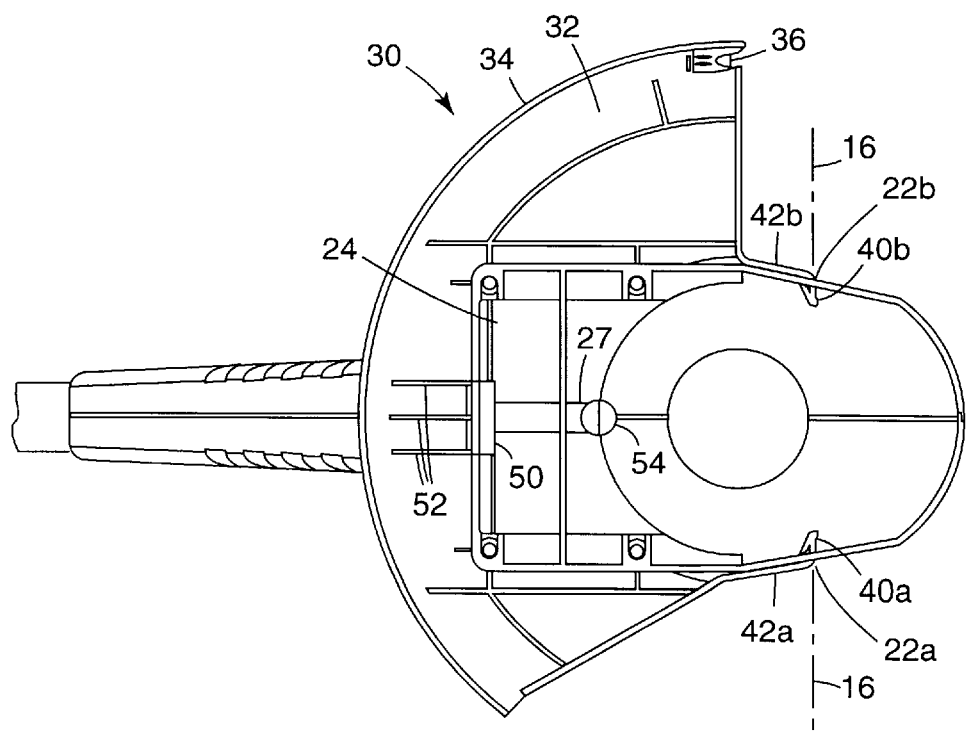
FIG. 6 is a bottom plan view of the grass trimmer of FIG. 2 with the trimmer shield assembled to the grass trimmer housing.

FIG. 6 depicts the underside of the housing 20 with attached trimmer shield 30 and illustrates the location of the first retaining members 40a and 40b extending through the retaining openings 22a and 22b, respectively, in the housing 20. Also illustrated in FIG. 6 is the engagement of the second retaining member 50 with the deck housing 24 of the housing 20. The illustrated second retaining member 50 receives a portion of the deck housing 24, thereby preventing deflection of the trimmer shield 30 in an upward direction (see arrow 51 in FIG. 2). The housing deck 24 itself restricts downward deflection of the trimmer shield 30 as discussed above.

Figure 7:
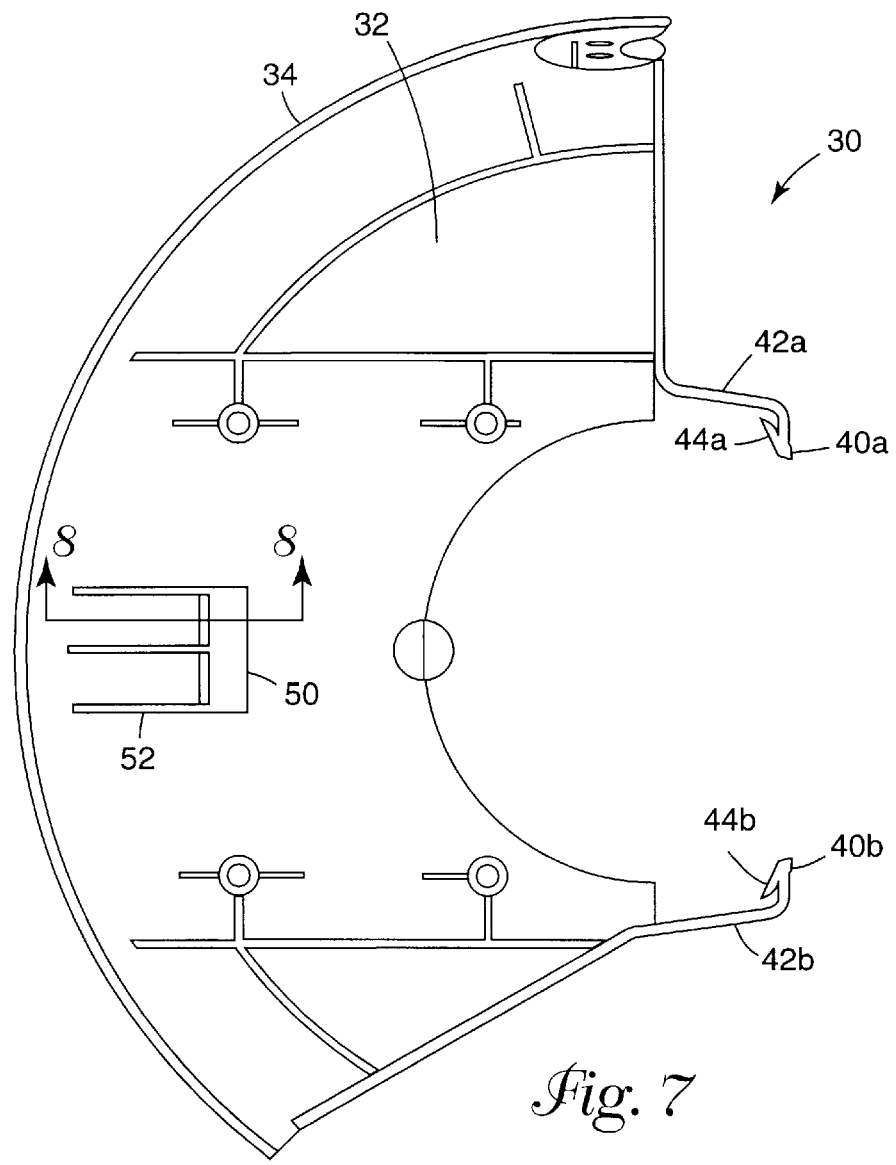
FIG. 7 is an enlarged view of the bottom of a trimmer shield according to FIGS. 2–6.
Figure 8:
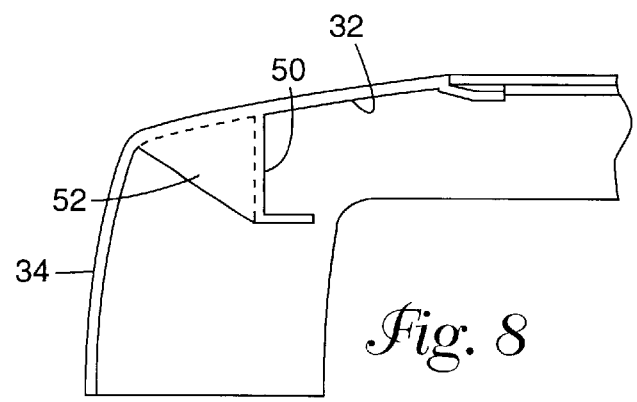
FIG. 8 is a partial cross-sectional view of the trimmer shield of FIG. 7 taken along line 8—8 in FIG. 7.

Turning now to FIG. 7, an enlarged view of the underside of the trimmer shield 30 depicted in FIGS. 2–6 is depicted illustrating the first retaining members 40 in more detail as well as the rotational retaining member 50. FIG. 8 depicts an enlarged cross-sectional view of the rotational retaining member 50 taken along line 8—8 in FIG. 7.

The illustrated first retaining members 40 preferably include structure that prevents their unwanted removal from the retaining openings 22 in the housing 20 after they have been inserted through the retaining openings 22. In the illustrated embodiment, the first retaining members 40a and 40b are preferably each formed with a barb 44a and 44b, respectively (referred to as barbs 44 below). The barb 44 on each of the first retaining members 40 is preferably cantilevered and biased outwardly from the remainder of the first retaining member 40 and, in the unrestrained condition, the barb 44 and first retaining member 40 have a width (at the widest point) that is greater than the width of the corresponding retaining opening 22 in the housing 20 of the grass trimmer 10.

During assembly, the barb 44 on each of the first retaining members 40 is compressed against the remainder of the first retaining member 40 to allow the retaining member 40 to pass through the retaining opening 22. As a result, it is generally preferred that the thickness of the first retaining member 40 with the barb 44 compressed is less than or equal to the width of the associated retaining opening 22. Once in or through the retaining opening 22, however, the barb 44 moves outwardly towards its unconstrained position relative to the remainder of the first retainer member 40 to prevent unwanted removal of the first retaining member 40 from the retaining opening 22.

As a result of the construction of the preferred first retaining members 40, they can be located within the retaining openings 22 in the housing 20 without the assistance of tools. In other words, as used in connection with the present invention, the first retaining members 40 can be manually inserted into the retaining openings 22 of the housing 20 of the grass trimmer 10 without the use of tools.

The second retaining member 50 used in connection with the illustrated trimmer shield 30 is depicted in cross-section in FIG. 8. The second retaining member 50 preferably forms a slot which receives a portion of the housing deck 24 in the illustrated housing 20. As a result, rotation of the trimmer shield 30 in a direction upward about an axis defined by a line 18 extending through the first retaining members 40 is restricted.

Although one preferred second retaining member 50 is depicted in connection with the illustrated trimmer shield 30, those skilled in the art will recognize that the depicted second retaining member 50 is only one example of a structure that can be used to restrict rotation of the trimmer shield 30 about the axis 18 and that many other structures that perform substantially the same function in substantially the same way to achieve substantially the same result could be used in place of the preferred second retaining member 50.

Furthermore, although in the illustrated grass trimmer 10 the housing 20 includes a housing deck 24 to restrict downward rotation of the trimmer shield 30, there may be other grass trimmers 10 and/or housings 20 in which a housing deck 24 is not provided. As a result, it may be desirable that the trimmer shield 30 include a second retaining member 50 that restricts rotational movement of the trimmer shield 30 both in the upward and in the downward direction about the axis of rotation 18 extending through the first retaining members 40.

Likewise, those skilled in the art will also understand that a wide variety of equivalent alternative structures that that perform substantially the same function in substantially the same way to achieve substantially the same result can be used in place of the illustrated first retaining members 40 including barbs 44. Substitution of those other equivalent structures will be considered within the scope of the present invention.

One of the primary considerations, however, for any structures used in the attachment of the trimmer shield 30 to the housing 20 is that the trimmer shield 30 be attachable without the use of tools. As discussed above, the term "manually" will be used to indicate that the operation described can be completed without the use of tools. For example, it is preferred that the first retaining members 40 be manually engageable with the corresponding retaining openings 22 in the housing 20. In other words, the retaining members 40 should be capable of engagement with the housing without the use of tools such that unwanted removal of the retaining members and, therefore, the trimmer shield 30 is prevented.

When the preferred or illustrated barbed first retaining members 40 are used, engagement will typically occur through the use of manual pressure forcing the first retaining members 40 through the retaining openings 22. Those skilled in the art will, however, understand that a variety of other structures could be used to achieve the same result, and those substitutions will be considered to be within the scope of the present invention. In other words, the illustrated first retaining members 40 constitute only one structure that provides a means for restricting translational movement of the trimmer shield 30 relative to the housing 20.

As discussed above, it is preferred that the trimmer shield 30 be capable of manual attachment to the housing 20 of the grass trimmer 10. It is also preferred that the first retaining members 40 be removable from the retaining openings 22 if, for example, the trimmer shield 30 needs to be removed from the housing 20. The removal of the trimmer shield 30 is preferably capable of being performed with minimal or no disassembly of the housing 20. It is more preferred that the trimmer shield 30 be removable from the housing 20 with no disassembly of the housing.

Although it is preferred that the trimmer shield 30 be manually attachable to the housing 20, removal of the trimmer shield 30 from the housing 20 after attachment may require the use of tools. For example, in the illustrated trimmer shield 30 with barbed retaining members 40, it may be helpful to compress the barbs 44 against the remainder of the first retaining members 40 with a flat-bladed tool such as a screwdriver, etc. to remove the first retaining members 40 from the retaining openings 22 in the housing 20. After the first retaining members 40 have been removed from the retaining openings 22, the trimmer shield 30 can typically be easily removed from the housing 20 by translational motion away from the rear of the housing 20.

Various modifications and alterations of this invention will become apparent to those skilled in the art without departing from the scope of this invention. Accordingly, it is to be understood that this invention is not to be limited to the illustrative embodiment set forth herein, but is to be controlled by the limitations set forth in the following claims and any equivalents thereof.

What is claimed is:

1. A hand-held grass trimmer comprising:
   a housing having a front, a rear and at least one retaining opening provided therein;
   a trimming element rotating below the housing about a first axis of rotation, wherein the first axis is generally vertical;
   a trimmer shield attached to the rear of the housing;
   at least one first retaining member integral with the trimmer shield, the first retaining member extending through the retaining opening in the housing, wherein the first retaining member and the retaining opening cooperate to restrict first movement of the trimmer shield away from the housing in a horizontal direction;
   at least one compressible barb on the first retaining member, wherein the compressible barb and the first retaining member have a width that is greater than a width of the retaining opening in the housing such that the barb is compressed during insertion through the retaining opening; and
   at least one second retaining member integral with the trimmer shield, wherein the second retaining member cooperates with the housing to restrict deflection of the trimmer shield about a generally horizontal axis intersecting at least one of the retaining openings.

2. A trimmer according to claim 1, wherein the compressible barb is cantilevered and biased outwardly from the first retaining member.

3. A trimmer according to claim 1, wherein the first retaining member is located on a first retaining member leg.

4. A trimmer according to claim 1, wherein the second retaining member is located rearward from the first retaining member.

5. A trimmer according to claim 1, wherein the housing further comprises a housing deck extending rearward from the housing.

6. A trimmer according to claim 5, wherein the second retaining member engages the housing deck.

7. A trimmer according to claim 1, wherein the housing is elongated from front to rear.

8. A trimmer according to claim 1, wherein the housing comprises at least two retaining openings, and further wherein the trimmer shield comprises at least two first retaining members integral with the trimmer shield, each of the first retaining members extending through one of the retaining openings, wherein the first retaining members and the retaining openings cooperate to restrict first movement of the trimmer shield away from the housing in a horizontal direction.

9. A method of assembling a hand-held grass trimmer comprising:
   providing a housing having a front and a rear, the housing comprising at least one retaining opening in the housing and a trimming element attached to the housing, the trimming element rotating about a first axis of rotation, wherein the first axis is generally vertical;

providing a trimmer shield comprising at least one integral first retaining member comprising a barb, and at least one second retaining member;

manually moving the housing and trimmer shield translationally relative to each other in a generally horizontal direction to align the first retaining member with the retaining opening in the housing, and further wherein the second retaining member engages the housing, wherein the trimmer shield is restricted from rotation about a generally horizontal axis intersecting the retaining opening; and manually engaging the first retaining member with the retaining opening comprising compressing the barb, whereby the trimmer shield is manually attached to the housing.

10. A method according to claim 9, wherein the movement of the trimmer shield and housing relative to each other is in a direction generally perpendicular to the first axis of rotation of the trimming element.

11. A method according to claim 9, wherein the housing further comprises a housing deck extending rearward from the housing.

12. A method according to claim 9, wherein the housing comprises a housing deck extending rearwardly from the housing, and further wherein the second retaining member engages the housing deck.

13. A method according to claim 9, wherein providing a housing further comprises providing at least two retaining openings and providing a trimmer shield further comprises providing at least two integral first retaining members each including a barb, and further wherein manually moving the housing and trimmer shield translationally relative to each other in a generally horizontal direction aligns each of the first retaining members with one of the retaining openings in the housing; and still further wherein the method comprises manually engaging each of the first retaining members with one of the retaining openings.

14. A method of disassembling a hand-held grass trimmer comprising:

a) providing a grass trimmer comprising:
   a housing having a front and a rear;
   a trimming element rotating below the housing about a first axis of rotation;
   a trimmer shield attached to the housing;
   at least two first retaining members integral with the trimmer shield, each of the first retaining members extending through a retaining opening located in the housing, wherein each of the first retaining members comprises a barb, and further wherein the first retaining members and retaining openings cooperate to restrict translational movement of the trimmer shield in a direction generally perpendicular to the first axis of rotation; and
   at least one second retaining element integral with the trimmer shield, wherein the second retaining element engages with the housing to restrict rotation of the trimmer shield about a second axis extending through at least one of the first retaining members;

b) removing each of the first retaining members from the retaining openings in the housing, wherein removing each of the first retaining members from the retaining openings comprises compressing the barb; and c) manually moving the trimmer shield translationally in a direction away from the housing, wherein the second retaining element member disengages from the housing, and further wherein the trimmer shield is removed from attachment to the housing.

15. A method according to claim 14, wherein movement of the trimmer shield away from the housing is in a direction generally perpendicular to the first axis of rotation of the trimming element.

* * * * *

UNITED STATES PATENT AND TRADEMARK OFFICE
CERTIFICATE OF CORRECTION

PATENT NO.: 6,052,976
DATED: April 25, 2000
INVENTOR(S): Cellini et al.

It is certified that error appears in the above-identified patent and that said Letters Patent is hereby corrected as shown below:

Column 2, line 14, please delete --members-- before "integral";

Column 2, line 14, please insert --member-- before "integral";

Column 2, line 17, please delete --first-- after "restrict";

Column 2, line 19, please insert --deflection-limiting-- before "second";

Column 2, line 32, please insert --deflection-limiting-- before "second";

Column 2, line 54, please insert --deflection-limiting-- before "second";

Column 5, line 46, please insert --deflection-limiting-- before "second".

Signed and Sealed this

Eighth Day of May, 2001

*Attest:*

NICHOLAS P. GODICI

*Attesting Officer*   Acting Director of the United States Patent and Trademark Office